United States Patent
Halasz et al.

(10) Patent No.: US 7,325,246 B1
(45) Date of Patent: Jan. 29, 2008

(54) ENHANCED TRUST RELATIONSHIP IN AN IEEE 802.1X NETWORK

(75) Inventors: David E. Halasz, Stow, OH (US); Merwyn B. Andrade, San Jose, CA (US); Pauline Shuen, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 1247 days.

(21) Appl. No.: 10/041,005

(22) Filed: Jan. 7, 2002

(51) Int. Cl.
| G06F 7/04 | (2006.01) |
| G06F 17/30 | (2006.01) |
| G06F 15/16 | (2006.01) |
| G06F 17/00 | (2006.01) |
| G06K 9/00 | (2006.01) |
| H04L 9/32 | (2006.01) |
| H04L 9/00 | (2006.01) |
| G06F 15/173 | (2006.01) |
| H04M 1/64 | (2006.01) |
| H04M 1/66 | (2006.01) |
| H04M 1/68 | (2006.01) |
| H04M 3/42 | (2006.01) |

(52) U.S. Cl. ............. 726/2; 726/3; 726/4; 726/12; 726/21; 713/154; 713/155; 713/168; 709/219; 709/223; 709/225; 709/229; 379/88.17; 455/411; 455/414.1

(58) Field of Classification Search ........... 713/168, 713/171, 181, 183; 726/2–4, 12, 21; 709/219, 709/223, 225, 229; 379/88.17; 455/411, 455/414.1
See application file for complete search history.

(56) References Cited

U.S. PATENT DOCUMENTS

| 6,138,239 | A | 10/2000 | Veil |
| 6,219,790 | B1 | 4/2001 | Lloyd et al. |
| 6,766,453 | B1* | 7/2004 | Nessett et al. ............. 713/171 |
| 7,024,690 | B1* | 4/2006 | Young et al. ............. 726/5 |
| 7,042,988 | B2* | 5/2006 | Juitt et al. ............. 379/88.17 |
| 7,073,066 | B1* | 7/2006 | Nessett ............. 713/181 |
| 7,174,564 | B1* | 2/2007 | Weatherspoon et al. ........ 726/2 |
| 2002/0090089 | A1* | 7/2002 | Branigan et al. ........... 380/270 |
| 2002/0157007 | A1* | 10/2002 | Sashihara ............. 713/183 |
| 2002/0157090 | A1* | 10/2002 | Anton, Jr. ............. 717/178 |
| 2002/0174335 | A1* | 11/2002 | Zhang et al. ............. 713/168 |

* cited by examiner

*Primary Examiner*—Ayaz Sheikh
*Assistant Examiner*—Shin-Hon Chen
(74) *Attorney, Agent, or Firm*—Tucker Ellis & West LLP

(57) ABSTRACT

Architecture for providing access to an IEEE 802.1x network. A trust relationship is created between a switch of the network and an access point of the network such that the access point is authorized to communicate over the network. The trust relationship is then extended from the access point to a wireless client requesting connection to the network such that access to the network by said wireless client is authorized.

16 Claims, 3 Drawing Sheets

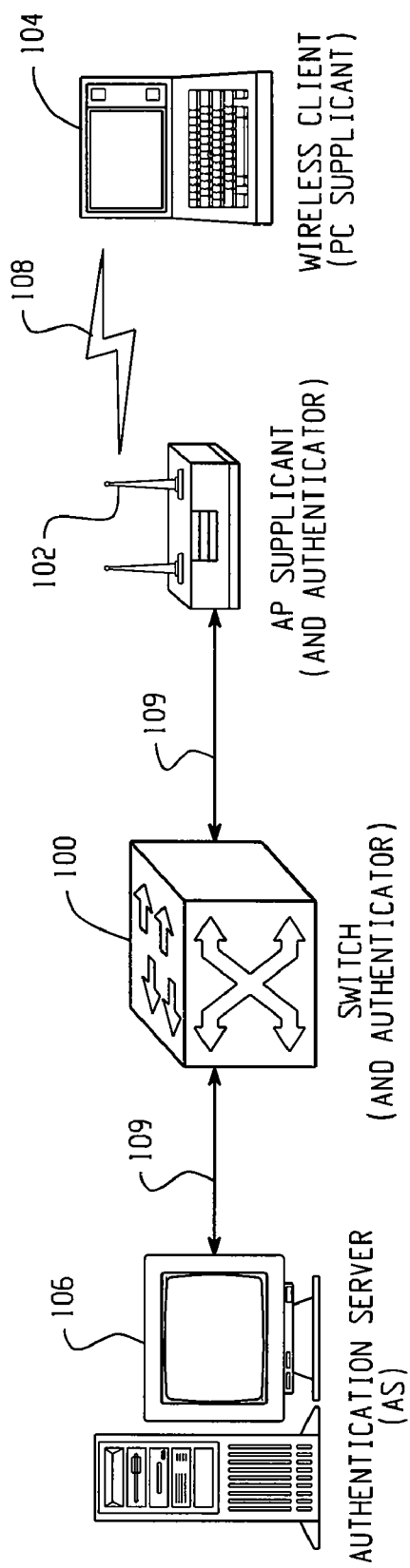
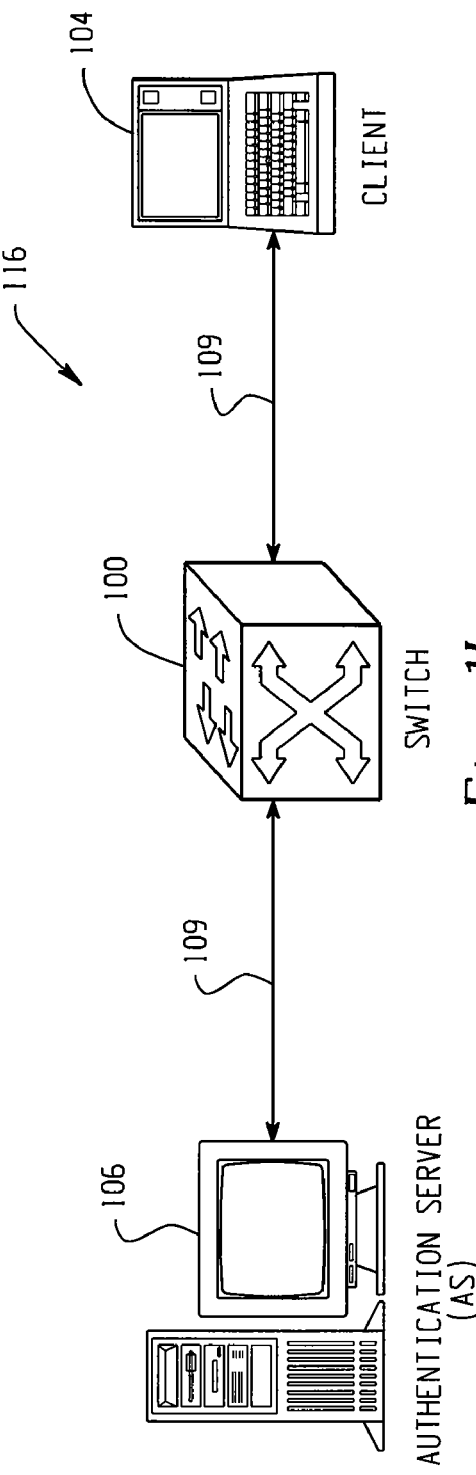
Fig. 1a
Fig. 1b

ENHANCED TRUST RELATIONSHIP IN AN IEEE 802.1X NETWORK

BACKGROUND OF THE INVENTION

This invention is related to controlling access in networks, and more specifically, to controlling access of a wireless client to a network in an IEEE 802.1x regime.

The IEEE (Institute of Electrical and Electronic Engineers, Inc) 802 Local Area Network standards provide guidelines for allowing users to physically connect to a network and access basic services provided therein. However, it has become more evident in recent years that controlled access is a necessity with the large amount of sensitive information that is communicated over networks of virtually any size. Access can be restricted by any number of methods, including user logins and passwords, network identification of a unique identification number embedded within the network interface card, call-back schemes for dial-up access, and others.

In an IEEE 802.3 network, such conventional wired network access protection schemes can be easily defeated since encryption is not used between network devices. Thus the use of a switch or bridge as an access point for protecting against unauthorized network access in a wired regime can be problematic. For example, if a switch port was made physically available in a conference room for connection thereto by a first wireless user having a laptop, connection to the local network would then be established through the switch. Network access for the wireless user is granted only through that switch port upon successful authentication. However, a problem with this implementation is that simply connecting a hub to the LAN between the switch and the access point can easily defeat it. Once the first wireless user connects to the LAN through a port of the hub, and is properly authenticated on the switch port, a second wired user could then plug-in to one of the hub ports and gain access to the network, since the switch port has authenticated the first user, and does not care about the other connected and unauthenticated users so long as the first wireless user provides authentication traffic to the switch.

The IEEE 802.1x standard offers an additional method for controlling network access utilizing port control. Port-based network access control makes use of the physical access characteristics of an IEEE 802 LAN infrastructure in order to provide a means of authenticating and authorizing devices attached to a switch port that has point-to-point connection characteristics. Thus in existing IEEE 802.1x implementations, when a network device designed as an access point (AP) comes online, the AP authenticates through the switch to an authentication server. When properly authenticated, the switch port becomes "opened" up for that authenticated AP. However, in this port-control implementation, since the port has been opened for the authenticated AP, any other unauthenticated client can now also connect through that AP and gain full access to the network. Such port authorization related to switches, bridges and routers needs to be made more secure since such network devices form the switch fabric that provide interconnectivity between the extensive number of networks in existence today. It would be advantageous, however, to have greater control over the use of device ports.

What is needed, instead of port control, is to provide more extensive control between wired and wireless entities, such that the trust relationship is extended beyond the access point to a wireless client. Once properly authenticated, the PC client is then established as a trusted client, insofar as the switch is concerned, and the information communicated between the wireless PC client and the switch is passed through the AP unimpeded and unaltered.

SUMMARY OF THE INVENTION

The present invention disclosed and claimed herein, in one aspect thereof, comprises architecture for providing access to an IEEE 802.1x network. A trust relationship is created between a switch of the network and an access point of the network such that the access point is authorized to communicate over the network. The trust relationship is then extended from the access point to a wireless client requesting connection to the network such that access to the network by said wireless client is authorized.

BRIEF DESCRIPTION OF THE DRAWINGS

For a more complete understanding of the present invention and the advantages thereof, reference is now made to the following description taken in conjunction with the accompanying drawings in which:

FIG. 1a illustrates a network block diagram that operates to control network access of a wireless client, in accordance with a disclosed embodiment;

FIG. 1b illustrates a network block diagram that operates to control network access of a wired client, in accordance with a disclosed embodiment;

DETAILED DESCRIPTION OF THE INVENTION

Figure 2:
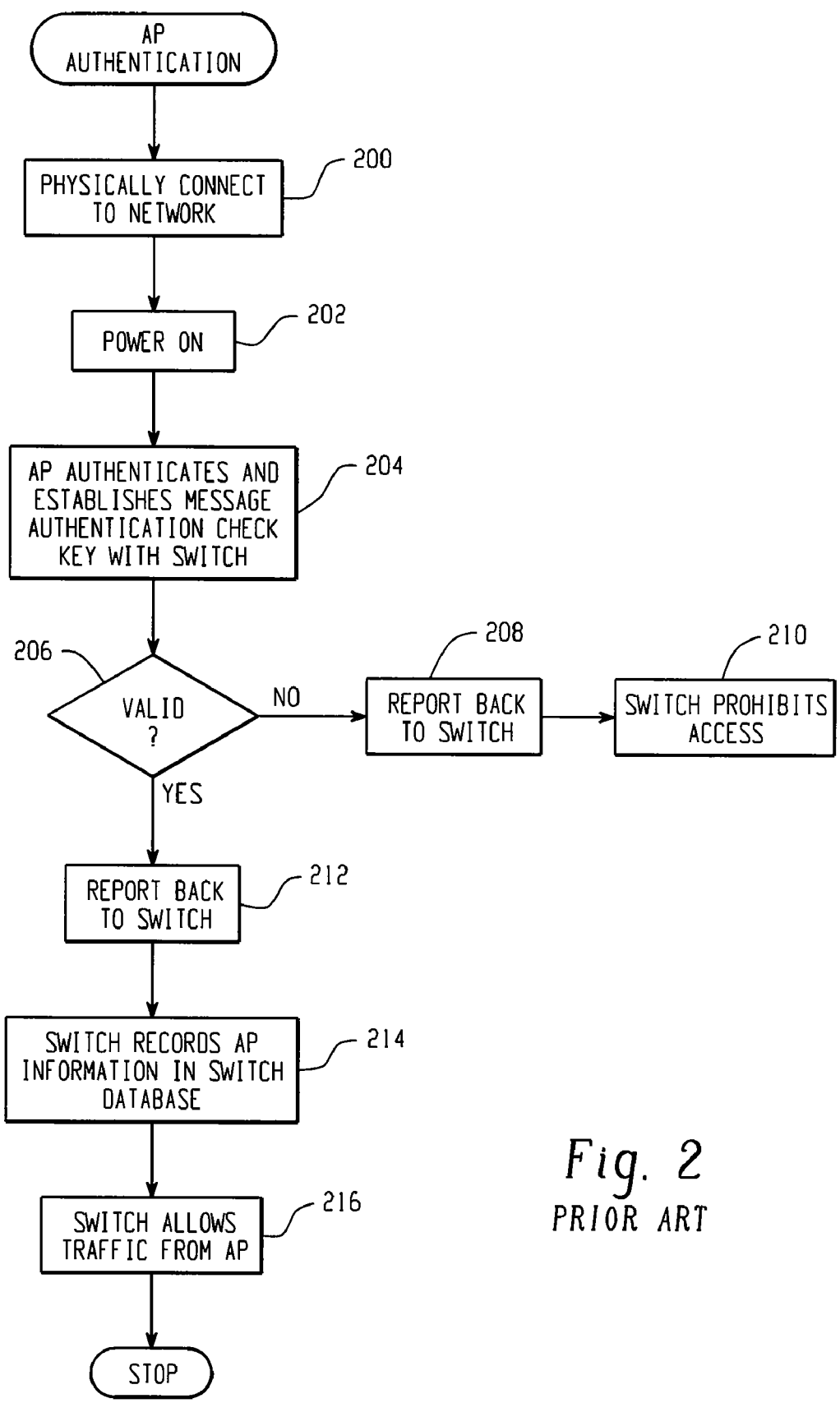
FIG. 2 illustrates a flow chart of the conventional process for authentication of an access point.

The disclosed method offers greater control over network access in point-to-point physical connections of local area networks (LANs) where once a first trusted user authorizes a switch port for use, the first trusted user can then extend the trust relationship to other users such that access to the network is gained through the same switch port. When the first trust relationship of an access point (AP) is extended to a wireless client, the wireless client is then established, insofar as the switch is concerned, as a trusted wireless client, and the information communicated between the wireless client and the switch is passed through an the AP unimpeded and unaltered. The disclosed architecture authorizes the user, and not just the port. Thus if a second client were to try and gain access to the network after the first client was properly authenticated, as described hereinabove with respect to an 802.3 Ethernet LAN, access attempted by the second client would fail.

Referring now to FIG. 1a, there is illustrated a block diagram that operates to control network access of a wireless client 104, in accordance with a disclosed embodiment. In an IEEE 802.1x regime, the trust relationships are established utilizing conventional encryption schemes. A basic IEEE 802.1x implementation (not illustrated topologically) consists of a switch 100 that operates to provide interconnectivity between a plurality of network devices disposed on a network 109 and optionally between a plurality of networks. An access point 102 (which may contain a "supplicant" and an "authenticator" in IEEE 802.1x terminology, and hereinafter denoted as "AP") provides the communicative transition point between the dedicated wired network 109 and a wireless client 104 (also called a "supplicant" in IEEE 802.1x terminology). An authentication server (AS) 106 is disposed on the wired network 109 to provide authentication services to those network entities requiring such a service. The AS 106 can be configured to run a RADIUS (Remote Authentication Dial-In User Service) protocol for authentication and authorization services. The AS 106 provides the authentication and authorization services to a network entity that functions as an authenticator. (A network entity can take the role of an authenticator when that entity performs authentication to the AS 106 on behalf of another entity requesting access to the network.) This service determines, from credentials provided by the AP 102, whether the AP 102 is authorized to access the services controlled by the authenticator (in this scenario, the switch 100). Note that the AS 106 can be co-located with an authenticator, or it can be accessed remotely via a network to which the authenticator has access. Additionally, the network 109 can be a global communication network, e.g., the Internet, such that authentication occurs over great distances from a remote location disposed thereon to the AS 106.

Authentication occurs primarily at system initialization time, or when a supplicant (such as the AP 102, or wireless client 104) requests connection to a port of an authenticator system or when authorized access has been become unauthorized, and subsequently needs to be reauthorized. (A system is defined as a device that is attached to a LAN by one or more ports, e.g., end stations, servers, MAC bridges, and routers.)

The AP 102 can authenticate to the AS 106 utilizing any one of a number of conventional authentication algorithms, e.g., EAP-Cisco Wireless, or a certificate-based scheme such as EAP-TLS.

Conventionally, when the AP 102 comes online, the switch 100 functions as an authenticator. The switch 100 receives a connection request from the AP 102 and passes the request and information related to the AP 102 to the AS 106. The AS 106 then checks its authentication database for preexisting identity information about the AP 102, depending on the authentication type. For example, where the authentication type utilizes a username and password as identity information, all or some of the identity information is passed from the AP 102 across the network to the switch 100, and from the switch 100 to the AS 106. If the AP identity information is not part of the AS database, the connection request of the AP 102 is discarded. When the authentication protocol is, e.g., EAP-Cisco Wireless, and the corresponding AP identity information is found in the AS database, the AS 106 mutually authenticates with the AP 102, based on the authentication type. Once mutual authentication between the AS 106 and the AP 102 is successful, a trust relationship is established between the AP 102 and the AS 106. The AP 102 is now trusted, and a message authentication check key exists between the switch 100 and AP 102.

At the end of the authentication handshaking between the AP 102 and AS 106, the switch 100 is notified of the successful authentication, and updates its database with the MAC address of the AP 102. Future authentications by the AP 102 through the switch 100 are no longer required to the AS 106, unless the AP 102 has become unauthorized for some reason.

The trust relationship between switch 100 and the AP 102 is then formed across the network channel. A second access point (not shown) connected to the network would have a correspondingly unique message authentication check key. Packets between the AP 102 and switch 100 can be determined to be valid by checking message digests. The message digests get calculated by using the message authentication check key that was established during authentication. Note that until authentication has successfully completed for the AP 102, a network connection request by the wireless client 104 via the AP 102 is blocked. Only the AP 102 has access to the authenticator system in order to perform authentication exchanges. This is not to say that the AS 106 is a single-threaded system, but is a multi-threaded system in that the AS 106 is operable to process multiple authentication requests substantially simultaneously from many network devices requesting such services.

The trust relationship now exists between the switch 100 and the AP 102 in accordance with the IEEE 802.1x standard, and the AP 102 is allowed full access to the services offered on the network via the controlled port of the switch 100. If, at this point, no other system authorizations would be required, the switch 100 would allow all traffic from the AP 102, not "knowing" that the packet traffic was actually coming from a client, or potentially more than one client, the latter which have not been properly authenticated.

In accordance with the disclosed architecture, the trust relationship is now extended to the wireless client 104 in that once authentication of the wireless client 104 is completed, the wireless client 104 will be a trusted client insofar as the switch 100 is concerned. Additionally, a session key is derived for the wireless client 104 in the same manner as for the AP 102 during its authentication process through the switch 100 to the AS 106. Thus first a message authentication check key exists between the AP 102 and the switch 100, and a session key exists between the AP 102 and the wireless client 104. The derived session key for the wireless client 104 uniquely encrypts the wireless client 104 to the AP 102 traffic, and the message authentication check key for the AP 102 uniquely verifies the AP 102 to the switch 100.

In operation, the trust relationship is extended to the wireless client 104 in the following manner. Once the dedicated network is operational and the wired entities are authenticated, the wireless client 104 seeking access to the network then needs to be authenticated. The wireless client 104, using conventional and encrypted air protocols, communicates a connection request via a communication link 108 to the AP 102, and which AP 102 now takes on an authenticator role. The AP 102 processes the connection request message by sending the wireless client 104 authentication to the AS 106. The packet information is sent to the switch 100 such that the switch 100 recognizes the traffic as coming only from the AP 102. The switch 100 then recognizes the traffic as coming from the authorized AP 102, and passes it through to the AS 106. Until such authorization occurs, the AP 102 restricts any uncontrolled traffic of the wireless client 104 beyond the AP 102, allowing access only to the AP 102 to perform authentication exchanges, or access services provided by the AP 102 that are not subject to access control restrictions placed on that port.

The AP 102 and the AS 106 continue to exchange information using EAP (Extensible Authentication Protocol) until the AS 106 has completed its authentication and reported the outcome of the authentication process. The authentication server 106 informs the AP 102, which depending upon the outcome, either allows traffic, or discards traffic coming from the wireless client 104. If the wireless client 104 is authorized, the AP 102 informs the switch 100 that the wireless client 104 MAC address is authorized. The AP 102 may also forward other information to the switch 100, such as an access control list (ACL) and quality-of-service (QoS) parameters for the wireless client 104. The switch 100 verifies that the AP 102 is sending the message by the AP 102 including a message digest, in the authorize packet. The switch 100 allows traffic from the wireless client 104 by storing the MAC address of the wireless client 104 in the switch database. The AP 102 then allows all traffic from the wireless client 104 as controlled traffic, which is handled differently by the AP 102. The AP 102 allows traffic to pass from the wireless client 104 unaltered and unimpeded directly to the switch 100. Once the wireless client 104 is authenticated, the AP 102 routes the client packet traffic as controlled traffic, and the AP 102 is no longer acting as a proxy, but simply passing the raw client packet traffic through to the switch 100. The switch 100 then interrogates the raw packet traffic coming through the AP 102 for authorized MAC addresses. All future traffic is then checked against the switch database of authorized MAC addresses in order to determine whether the traffic will be allowed.

Note also that the wireless client 104 comprises numerous wireless devices, including, but not limited to, a laptop/notebook portable computer having Cardbus network adapter suitable for wireless communication with a wired network, an electronic tablet having a suitable wireless network adapter, a handheld device containing a suitable wireless network adapter for communicating to a wired network, etc.

Referring now to FIG. 1b, there is illustrated a general block diagram of an alternative embodiment wired system 116 that utilizes the described protocol. The wired system 116 includes the AS 106, and switch 100 disposed on the network 109. In this particular embodiment, the AP 102 of FIG. 1a is replaced with the switch 100. The switch 100 is configured to run the IEEE 802.1x protocol. Since the client 104 utilizes a wired connection, and no encryption is available between the client 104 and the switch 100. Thus the trust relationship established first between the switch 100 and the AS 106 must now be extended to the client 104. The client 104 can be easily converted to operate either wirelessly according to FIG. 1a, or in the wired environment of FIG. 1b by making the appropriate hardware implementations.

Referring now to FIG. 2, there is illustrated a flow chart of the conventional process for authentication of an AP 102. The discussion encompasses connecting the AP 102 to the network for the first time, however, it can be appreciated that subsequent operation may merely require powering the AP 102, after which authentication occurs, or utilizing a continually-powered-and-connected AP 102 such authentication is required only once at power-up, and only thereafter is reauthorization is requested.

Flow begins at a function block 200 where the AP system 102 is connected to the wired network. Power is then applied to the AP 102, as indicated in a function block 202. Flow is to a function block 204 where the AP 102 authenticates and establishes a message authentication check key with the switch 100. Flow is to a decision block 206 where the AS 106 determines if the AP 102 is an authorized network device. If after comparing the received AP identity information with an authentication database, and determining that the AP 102 is not in the database, flow is out the "N" path to a function block 208 where the AS 106 reports back to the switch 100 that authentication has failed. Flow is to a function block 210 where the switch 100 then prohibits any packet traffic from the AP 102.

On the other hand, if the AS 106 finds that the received AP identity information is in the authentication database, flow is out the "Y" path of decision block 206 to a function block 212 where the AS 106 reports back to the switch 100 that the AP 102 is an authorized system. The switch 100 then adds selected information about the AP 102 in its switch database, e.g., the MAC address of the AP 102 and the message authentication check key, as indicated in a function block 214. Flow is to a function block 216 where the switch 100 allows any future traffic from the AP 102 to pass through the switch 100. The message authentication check key is stored for future use. The message authentication check key is used to "sign" MAC address authorization packets to the switch 100, after a wireless client authenticates. The process then reaches a Stop point.

Figure 3:
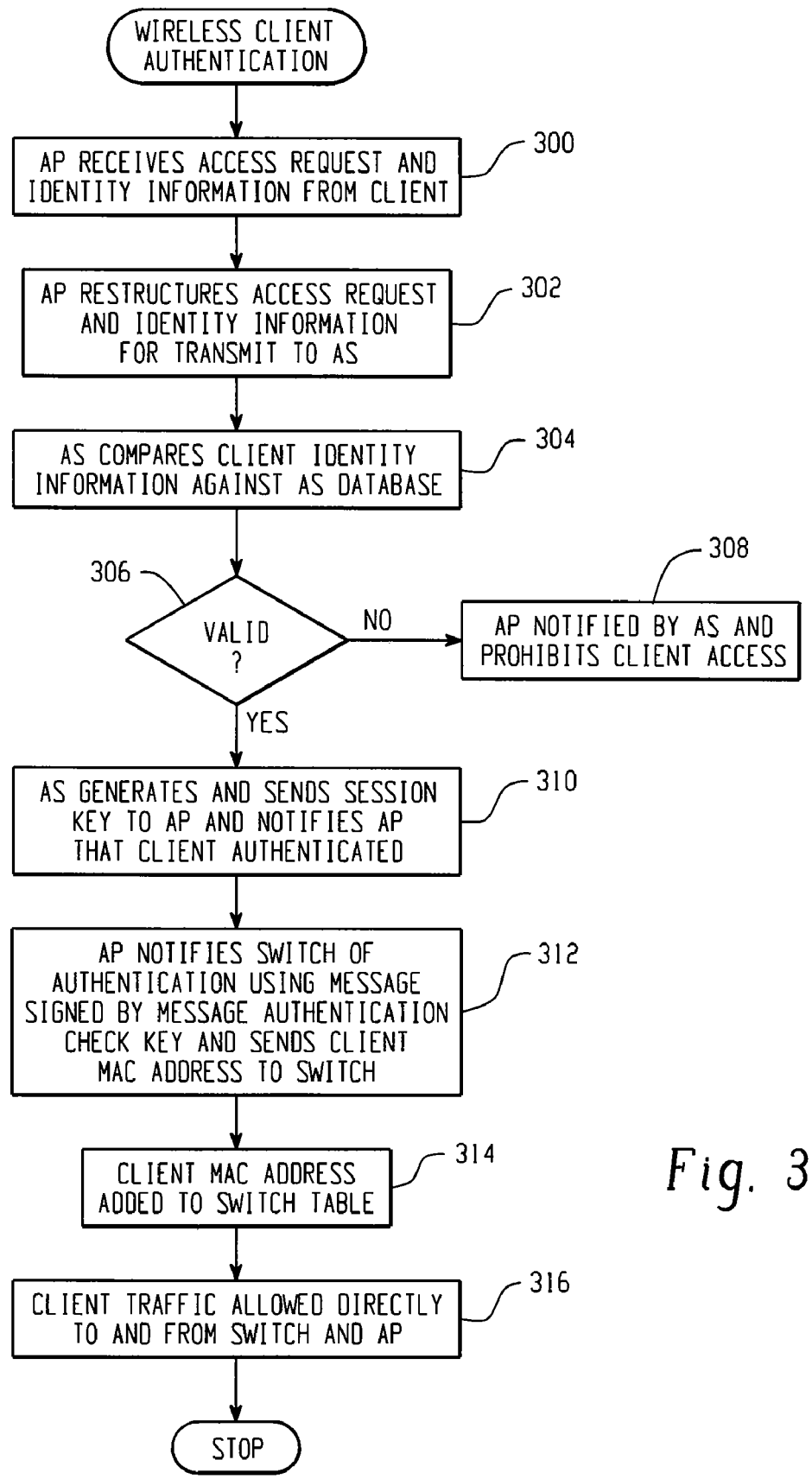
FIG. 3 illustrates a flow chart of the information exchange between the various entities for processing requested access by a wireless client 104, in accordance with a disclosed embodiment.

Referring now to FIG. 3, there is illustrated a flow chart of the information exchange between the various entities for processing requested access by the wireless client 104, in accordance with a disclosed embodiment. After the wireless client 104 powers up and reaches an initial state, authentication of the client 104 commences. Flow is to a function block 300 where the AP 102 receives access request packet traffic with client identity information from the client 104. In a function block 302, the AP 102 restructures the client traffic, and forwards the traffic through the switch 100 to the AS 106. As mentioned hereinabove, once the AP 102 becomes a trusted entity, subsequent packet traffic therefrom moves unimpeded through the switch 100 to the AS 106, and other network services. Flow is then to function block 304 where the AS 106 compares the client identity information against an AS database of authorized entities.

In a decision block 306, a determination is made whether the client 104 is authorized to access the network. If the client identity information is not found in the AS database, flow is out the "N" path to function block 308 where the AS 106 notifies the AP 102 that authentication failed, and to prohibit network access to the client 104. If authentication is successful, flow is out the "Y" path of decision block 306 to a function block 310 where the AS 106 generates a session key, and sends the key and authorization state to the AP 102. In a function block 312, the AP 102 then notifies the switch 100 (with packet traffic signed by the message authentication check key) that authentication state of the client 104 was successful, and also sends the MAC address of the client 104 to the switch 100. The AP 102 may also forward other information to the switch 100, such as an ACL and QoS parameters for the wireless client 104. The digest created by the shared message authentication check key established between the switch 100 and AP 102 is used to verify the transmitted authentication state and wireless client MAC address. The switch 100 adds the MAC address of the client 104 to its switch table database, as indicated in a function block 314. Flow is to a function block 316 where the client 104 is now a trusted entity, and subsequent client traffic is then allowed directly to and from the switch 100 and AP 102. The process then reaches a Stop point.

The trust relationship has now been extended to the authorized wireless client 104 in that the AP 102 and the switch 100 now allow the packet traffic of the wireless client 104 to pass unimpeded and unaltered directly through to the wired network backbone. The presence of the encrypted session established between the wireless client 104 and the AP 102 substantially reduces the possibly of an unauthorized wireless client from connecting to the network via the AP 102, and the switch 100 now having further information about the wireless client 104 further reduces the possibly of another client succeeding in connecting to the wired backbone.

As indicated in the foregoing discussion, multiple wireless clients and access points can access a single network with each establishing encrypted links. When fully authenticated, each wireless client will have its MAC address listed in the switch table as an authorized source of traffic. It can be appreciated that many conventional networks also include more than one switch 100, such that the switches are configured in parallel or in a serial fashion.

Although the preferred embodiment has been described in detail, it should be understood that various changes, substitutions and alterations can be made therein without departing from the spirit and scope of the invention as defined by the appended claims.

What is claimed is:

1. A system, comprising:
an authentication server disposed on a network;
a switch coupled to the network and communicatively coupled to the authentication server via the network, the switch comprises a switch table containing a list of allowed addresses; and
an access point communicatively coupled to the switch;
wherein the switch is configured to allow packets having addresses listed in the switch table and the switch is configured to block packets having addresses that are not in the switch table;
wherein the switch is configured to be the authenticator for the access point and is configured to authenticate the access point with the authentication server and establish a secure communication session with the access point;
wherein the access point is configured to be the authenticator for a wireless client having an address, the access point communicates with the authentication server using the secure communication session established with the switch;
wherein the access point is configured to send a message to the switch via the secure communication session, the message comprising data indicating the wireless client is authenticated, responsive to successfully authenticating the wireless client with the authentication server;
wherein the switch is responsive to receiving the message from the access point indicating the wireless client is authenticated to add an address for the wireless client into the switch table
wherein the access point is configured to forward all communications received from the authenticated wireless client to the switch responsive to the wireless client successfully authenticating with the authentication server; and
wherein the switch is configured to forward all communications received from the wireless client via the access point onto the network after adding the address for the wireless client into the switch table.

2. The system according to claim 1, wherein the switch updates the switch table with a medium access control address, a quality of service parameter and an access control list.

3. The system according to claim 1, wherein a session key is generated for subsequent communications between the authenticated wireless client and the access point responsive to the authenticated wireless client successfully authenticating with the authentication server.

4. The system according to claim 1, further comprising the authentication server is responsive to establish a message authentication check key for the secure communication session between the switch and the access point.

5. The system according to claim 4, wherein the a message authentication check key uniquely identifies the access point to the switch.

6. The system according to claim 4, further comprising:
the access point is configured to send the data indicating the wireless client is authenticated signed with the message authentication check key; and
the switch is responsive to receiving the data representative of the authenticated wireless client to verify the message authentication check key.

7. A system according to claim 1, wherein the authentication server is configured to send data representative of a session key for the wireless client to the access point responsive to the wireless client successfully authenticating.

8. An apparatus, comprising:
a wireless switch configured to be in data communication with a network having an authentication server disposed thereon and the switch is configured to be in data communication with an access point; and
a switch table coupled to the switch, the switch table containing a list of authorized addresses;
wherein the switch is configured to verify an address of a packet received from the access point with the switch table;
wherein the switch is configured to forward packets from the access point onto the network responsive to the verifying the address of the packet is in the switch table;
wherein the switch is configured to block packets from the access point from reaching the network responsive to determining the address of the packet is not in the switch table;
wherein the switch is configured to authenticate the access point with the authentication server and to store the address of the access point in the switch table responsive to successfully authenticating the access point;
wherein the switch is configured to allow authentication packets between the access point and the authentication server on the network for a wireless client having an address attempting to associate with the access point after the switch has added the address of the access point to the switch table;
wherein the switch is configured to add the address of the wireless client to the switch table responsive to receiving a message from the access point that the wireless client is authenticated after the switch has authenticated the access point; and
wherein the switch is configured to allow packets from the wireless client to pass onto the network after adding the address of the wireless client to the switch table.

9. The apparatus according to claim 8, wherein the switch updates the switch table with a medium access control address, a quality of service parameters and an access control list for the wireless client responsive to receiving a message from the access point that the wireless client is authenticated after the switch has authenticated the access point.

10. The apparatus according to claim 8, further comprising the switch is configured to establish a message authentication check key communications between the switch and the access point.

11. The apparatus according to claim 10, wherein the a message authentication check key uniquely identifies the access point to the switch.

12. The apparatus according to claim 10, further comprising the switch is configured to verify the message from the access point that the wireless client is authenticated was signed with the message authentication check key.

13. A method, comprising:
- configuring a switch disposed between an access point having an address and a network with a table of allowed addresses to allow a packet having an address received from the access point onto the network responsive to the address of the packet matching an address in the table of allowed addresses;
- configuring the switch to block a packet having an address received from the access point responsive to the address of the packet not matching an address in the table of allowed addresses;
- receiving a communication from an access point having an address;
- authenticating the access point with an authentication server, whereupon a successful authentication, the access point is an authenticated access point;
- adding the address of the authenticated access point to a table of authorized users;
- forwarding authentication packets from the authenticated access point onto the network;
- adding the address of a wireless client to the table of authorized users responsive to receiving a message from the authenticated access point that the wireless client is an authenticated wireless client; and
- forwarding packets received from the wireless client onto the wireless network after the wireless client is added to the table of authorized users.

14. The method according to claim 13, wherein the adding the address of a wireless client further comprises adding a medium access control address, a quality of service parameter and an access control list for the wireless client.

15. The method according to claim 13, the authenticating the access point further comprises establishing a message authentication check key for communications with the access point.

16. The method according to claim 15, further comprising verifying the message from the authenticated access point was signed with the message authentication check key.

* * * * *